US006591461B2

(12) United States Patent
Salentine et al.

(10) Patent No.: US 6,591,461 B2
(45) Date of Patent: Jul. 15, 2003

(54) CONNECTOR WITH STRAIN RELIEF

(76) Inventors: John A. Salentine, 105 Campo Vista Dr., Santa Barbara, CA (US) 93111; Ken Collin, Jr., 1501 Goodyear Ave., Suite B, Ventura, CA (US) 93003

( * ) Notice: Subject to any disclaimer, the term of this patent is extended or adjusted under 35 U.S.C. 154(b) by 0 days.

(21) Appl. No.: 09/835,228

(22) Filed: Apr. 13, 2001

(65) Prior Publication Data

US 2002/0148078 A1 Oct. 17, 2002

(51) Int. Cl.$^7$ .............................................. A44B 21/00
(52) U.S. Cl. ..................... 24/115 F; 24/115 R; 24/575; 24/265 H; 403/220
(58) Field of Search ........................ 24/115 F, 114.5, 24/115 R, 115 H, 129 R, 602, 265 H, 575; 403/208, 209, 210, 220, 353

(56) References Cited

U.S. PATENT DOCUMENTS

| | | | | | |
|---|---|---|---|---|---|
| 3,779,004 | A | * | 12/1973 | Gloeckler | 16/48.5 |
| 3,994,265 | A | * | 11/1976 | Banks | 119/865 |
| 4,095,787 | A | * | 6/1978 | Saferstein | 473/423 |
| 4,296,925 | A | * | 10/1981 | Alston | 473/430 |
| 4,416,037 | A | * | 11/1983 | Panthofer et al. | 24/665 |
| 4,634,321 | A | * | 1/1987 | McClelland | 279/149 |
| 4,678,360 | A | * | 7/1987 | Miller | 24/128 |
| 4,977,860 | A | * | 12/1990 | Harwell | 119/794 |
| 5,080,045 | A | * | 1/1992 | Reese et al. | 119/770 |
| 5,493,934 | A | * | 2/1996 | Kelley | 403/209 |
| 5,681,071 | A | * | 10/1997 | Ewart | 294/75 |
| 6,030,303 | A | * | 2/2000 | Wallace, Jr. | 473/575 |
| 6,053,850 | A | * | 4/2000 | Martinez et al. | 482/118 |
| 6,250,256 | B1 | * | 6/2001 | Lin | 119/769 |
| 6,302,250 | B1 | * | 10/2001 | Sadow et al. | 190/115 |
| 6,308,662 | B1 | * | 10/2001 | Furman | 119/772 |
| 6,360,408 | B1 | * | 3/2002 | Dykstra et al. | 24/115 G |

* cited by examiner

Primary Examiner—Robert J. Sandy
Assistant Examiner—Andre' L. Jackson
(74) Attorney, Agent, or Firm—Michael G. Petit

(57) ABSTRACT

A connector to attach cable or line to an article of gear whereby the cable or line is protected from fatigue through the use of a strain relief system and incorporates the ability to easily connect or disconnect the gear from the cable. The cable/line is permanently attached to the cable connection device with a knot or cable crimp. A strain relief for the cable/line is provided by a spring wrapped around the cable/line to prevent bending at the connection point, a heavy material coating around the cable/line again to prevent bending at the connection point, or a pivoting ball connection to allow the cable/line to move without bending the cable/line at the joint. A disconnect method is provided by a clipping system that allows the cable connection device to be connected or disconnected from the gear.

2 Claims, 2 Drawing Sheets

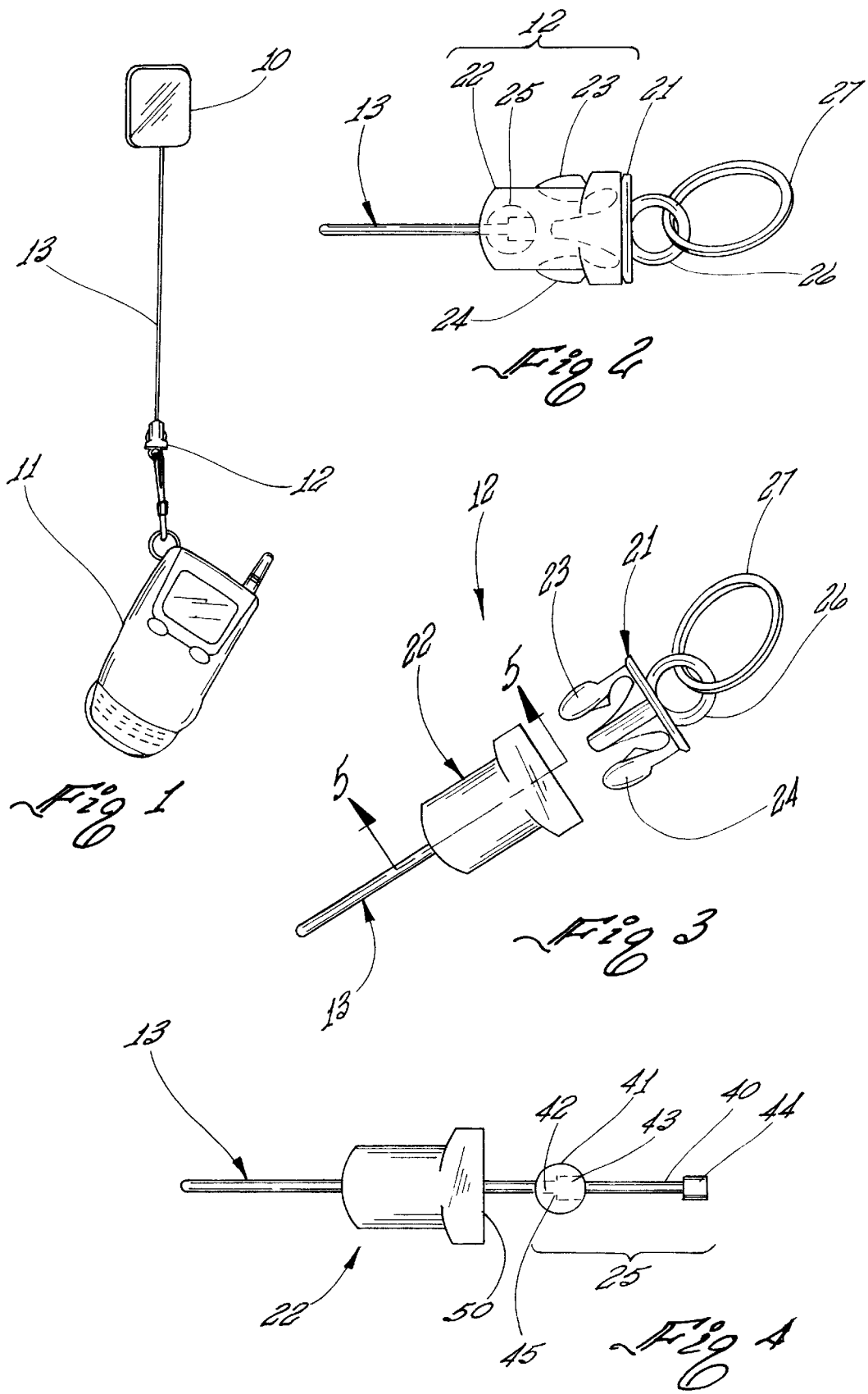

CONNECTOR WITH STRAIN RELIEF

BACKGROUND OF THE INVENTION

1. Technical Field

The present invention is directed toward quick release buckles of the type used for tethering a tool to an object or the body of a person and more particularly to a strain relief for a quick release buckle.

2. Background Art

Many tools are either carried on a person, stored in a holster, pouch or pocket, or attached to a permanent fixture. The use of lanyard tethering devices for protecting such tools against loss or damage while making the tools readily available for easy use is well known in the art. This is achieved through a number of tethering or mounting devices which include neck-type lanyards, wrist-type lanyards and automatic retracting devices utilizing string or cable for the connection media or hard mounted clipping devices. A common feature of such quick release buckles is the ability to connect and disconnect a tool easily from the lanyard tethering device. This function is provided by a number of prior art clipping systems on the market which range from snap clips and split rings to more sophisticated devices such as side release type Bakker et al., in U.S. Pat. No. 4,171,555, disclose a plastic buckle adapted to adjustably secure extremities of a web-like material. The buckle includes a frame-like body portion, fastening means at one end of the body portion for fixedly securing the buckle to one extremity of said web-like material and means for adjusting the opposite extremity of the web-like material including two transverse parallel bars positioned adjacent the opposite end of the body portion.

Another buckle of the quick release type is disclosed by Tracy in U.S. Pat. No. 4,150,464. The Tracy buckle includes separable cooperating receptacle and clasp members. The receptacle member includes a pair of locking slots formed in opposing sides thereof. The clasp member includes a pair of resilient arms having locking tabs thereon for releasably engaging the locking slots of the receptacle member. The receptacle member also includes a pair of grooves for slidably engaging cooperating raised ridges formed on a central arm of the clasp member for guiding said clasp member during insertion into and removal from the receptacle member. The central arm of the clasp member also includes a pair of laterally extending edges for defining a limit to the inward bending of the resilient arms. The receptacle also includes a belt end termination member including a slide member for adjusting the length of a belt looped around said slide member. The clasp member also includes a base member joining the three arms thereof and including a through slot for terminating a belt end or the like.

Prior art quick release buckles lack a feature which can improve the life expectancy of the cable or line of the tethering device such as a self-retracting mechanism such as a strain relief type system at the connection joints. Without such a strain relief system the life expectancy of the cable is, in some cases, extremely low. The term "strain relief" as used herein, refers to means for protecting the cable from fatigue due to continuos bending at the termination point. The need for improved life expectancy of the cable or line is very important for a device that is intended to protect the gear or tool from loss or damage. Furthermore the capability for being able to connect and disconnect gear may not only be a convenience but also a safety issue. The present invention is directed toward overcoming both of these problems inherent in prior art quick release buckles.

SUMMARY OF THE INVENTION

The attachment of the cable/line to the connector and strain relief system is achieved by passing the cable or line into the female component of the connector, through a pivoting ball and terminating the cable with a cable stop or a knot in a line. The Pivoting ball rests in the bottom of the female connector as its securing point. Furthermore, the pivoting ball can rotate thereby providing a strain relief to the cable by allowing the cable a pivot point instead of bending at the termination. In a preferred embodiment, the pivoting ball may have a slot to allow the cable to be attached to the ball after the cable stop has been attached to the cable or a knot has been tied in the line.

Alternatively, the strain relief may be provided through the use of an overmolded housing to prevent the cable/line from bending at the joint as opposed to a strain relief type system that prevents pull on the joint (as cited in U.S. Pat. No. 5,581,821, item 21 & 22, or in U.S. Pat. No. 6,179,104, item 45). Another type of strain relief may be provided through the use of spring system to prevent the cable/line from bending at the joint. The disconnection system has been designed to provide significant holding force while allowing the gear or tool to be connected to or disconnected from the female connector easily and without degradation to the part. A commonly used side release system has been incorporated into the present invention. Alternately, any number of connect/disconnect systems may be used in accordance with the buckle strain relief mechanism of the present invention to achieve similar results.

The features of the invention believed to be novel are set forth with particularity in the appended claims. However the invention itself, both as to organization and method of operation, together with further objects and advantages thereof may be best be understood by reference to the following description taken in conjunction with the accompanying drawings in which:

BRIEF DESCRIPTION OF DRAWINGS

FIG. 1 is a perspective view showing a buckle with a strain relief mechanism in accordance with the present invention employed to tether a cell phone to a retractor device.

FIG. 2 is a top view showing an engaged quick-connect/release buckle system having a strain relief in accordance with the present invention.

FIG. 3 is a top view of the buckle of FIG. 2 showing the connection/disconnection system in a disengaged configuration.

FIG. 4 Side perspective diagrammatic view showing the detailed cable attachment system with pivoting ball type strain relief with the ball extending from the connector prior to assembly.

DESCRIPTION OF PREFERRED EMBODIEDMENT

Figure 5:
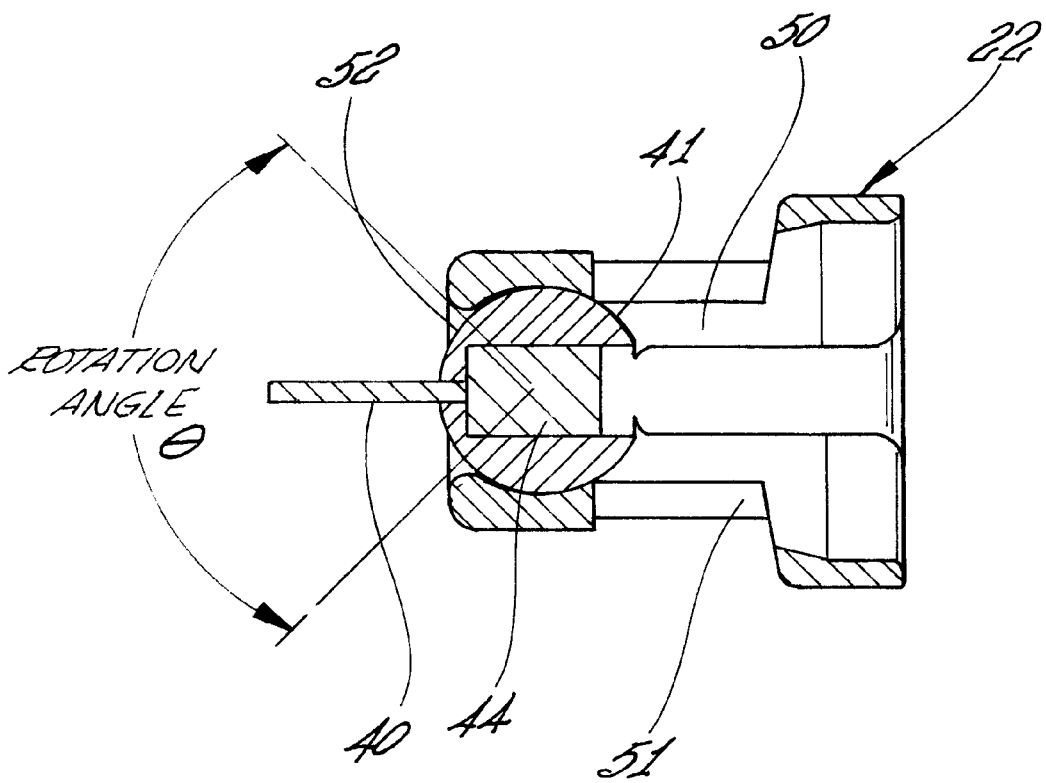
FIG. 5 is a cross-section view taken along section line 5—5 of FIG. 3 showing the pivot ball with a cable attached thereto and the strain-free range of angular motion of the cable with respect to the buckle.

FIG. 1 is an example of an application of a quick-release buckle connector employed to couple a retracting type of tethering device 10 to a tool such as a cell phone 11 or similar gear or instrumentation in order to prevent the loss of and/or damage to the gear. The quick-release connector 12 couples a cable 13 housed within and dispensed from the retractor device 10 to the tool 11 gear/device to the tethering device while incorporating a strain relief to prevent cable/line fatigue during the use of the gear/device. The tethering device 10 is usually adapted to include means for attaching the retractor device 10 to a person or other fixed supporting object. The cable 13 is attached to tethering device 10 and to the buckle connector 12, which in turn is attached to the particular gear or tool 11.

A quick-release buckle connector 12 in accordance with the present invention is shown in FIG. 2. The connector 12 comprises a male portion 21 and a female portion 22 (the connector is shown in an engaged configuration in FIG. 2). The operation of the quick-release connector 12 is well known in the art. Briefly, the male portion 21 has a pair of elastically deformable legs 23 and 24 attached thereto and integral therewith. When the legs 23 and 24 are squeezed together, the male portion 21 may be inserted into a recess 50 (shown in FIG. 5) within the female portion 22 as shown. When the pressure on the legs is relaxed, the legs lockingly engage a slot 51 or similar detent within the female portion to prevent removal therefrom. The male portion 21 of the connector preferably includes tool attachment means 26 and 27 operable for attaching a tool to the male portion of the connector. FIG. 3. shows the female portion 22 of the connector 12 disconnected from the male portion 21 of the connector. The cable 13 is connected to a pivoting ball strain relief system shown in phantom at numeral 25.

FIG. 4 is an exploded view showing the distal end 40 of the cable 13 fed through the recess 50 in the female portion 22 of the connector and a pivoting ball 41 containing slot 42 and a cable stop recess 43. Cable stop 44 is crimped to the distal end 40 of the cable or a knot is tied to prevent the distal end of the cable from separating from a cable stop 44. When the cable stop 44 is pulled into the cable stop recess area 43, the shoulder 45 of the recess prevents the cable stop 44 and the distal end 40 of the cable 13 from being pulled through the female portion 22 of the connector.

Figure 6:
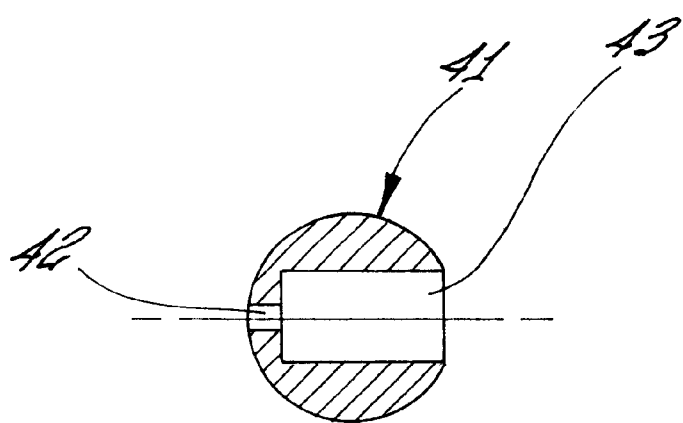
FIG. 6 is a lateral cross-sectional view of a ball for attachment to a cable in accordance with the present invention

Turning now to FIG. 5, the female portion 22 of a quick-release connector in accordance with the present invention is illustrated in lateral cross-sectional view taken along section line 5—5 of FIG. 3. The pivoting ball 41 is housed within a recess in the female portion having a spherical inner surface 52. The pivoting ball 41 rotates through a solid angle θ within the recess 52 to prevent friction between the distal end 40 of the cable and the surrounding structure of the female portion of the connector. Such a construction reduces fatigue on the material comprising the cable and prolongs maintenance of its structural integrity. The pivoting ball is shown in lateral cross-sectional view in FIG. 6.

The quick-release connector of the present invention is particularly adapted for attaching a tool to a retractable cable that serves to tether the tool or similar equipment to a person or surface. Such a retractor device is disclosed, for example, in U.S. Pat. No. 5,697,572 to the present inventors. The '572 patent discloses a tethering device for securely holding and extendably presenting an article, particularly an article such as scuba diving equipment and the like required for activities performed in extreme environments. The device includes a durable body-mountable plastic case housing a cord-retracting mechanism. One end of a tethering cord is attached to the cord-retracting mechanism. The other end of the cord extends through a guide hole in the case and has means thereon for attachment to an article such as a quick-release connector in accordance with the present invention. The retractor device is particularly adapted for use as a retractable tether for tools used in extreme environments such as underwater diving equipment.

While particular embodiments of the present invention have been illustrated and described, it would be obvious to those skilled in the art that various other changes and modifications can be made without departing from the spirit and scope of the invention. There are many applications wherein a tool can be advantageously attached to a retractor device using the quick-release connector of the present invention. Exemplary of such applications are hand tools, Gear (Rescue, Fire, Police, Military, Industrial Safety, Fishing, Hunting, Camping, Space, Survival), Instrumentation, Gauges, Duck Calls, Flashlights, Compasses, Safety Whistles, Knives/Saws, Pliers, Multi-Tools (i.e. Leatherman tools), Scissors/nippers/forceps/hook extractors, Binoculars and Binocular Stabilizers, Keys, Badges, Containers and Boxes, Writing Instruments, Pull Lines (for gear or boats & Personal Water Craft), Insulin pumps, Nets, Boga Grips, Wading Staffs, Fly Boxes, Fly Fishing Tools, Lapel Mics, CB /2-Way Radio/Marine Mics, Cell Phones, Pagers, Palm Pilots / PDA's, FRS Radios, 2-Way Radios, Dog Training Transmitters, GPS units, Remote Controls, Cameras, Photo Light Meters, Bar Code Scanners, Gas Detection, Meters,Instrumentation, Electrical Testers, SCUBA equipment including Gauges, Consoles, Computers, Compasses, Writing slates, Lobster gauges/tools, Abalone Irons, Goodie Bags, Fish Stringers, Spare Air, Octopus, other breathing apparatus, Goggles/Mask, Fire Arms, Mace and pepper spray, Tensioners for: Seat Belts Safety Lines and Fall Protection Lines and Anchor Lines. It is therefore intended to cover in the appended claims all such changes, applications and modifications that are within the scope of this invention.

What we claim is:

1. A quick-release connector comprising a male portion, a female portion and a tether having a free end and a fixed end, said fixed end of said tether provided with a stop, said female portion having a leading end with a circular opening therein, a trailing end and a body portion therebetween, said male portion adapted to be insertable into said trailing end of said female portion, thereafter the male portion lockingly and releasably engaging the female portion, said body portion of said female portion of said connector having a recess therein with a substantially spherical ball rotationally and housed within said recess, said ball being attached to said fixed end of said tether, said free end of said tether said ball including a means for preventing detachment of said stop from said recess of said female portion when a pulling force is applied to said free end of said tether, extending forwardly through said circular opening in said leading end of said female portion.

2. The quick-release connector of claim 1 wherein said free end of said tether is affixed to a retractor device.

* * * * *